Feb. 17, 1959   A. L. QUINLAN   2,874,264
PERCUSSION WELDING GUN FOR WELDING WIRES TO ARTICLES
Filed April 27, 1956   2 Sheets-Sheet 1
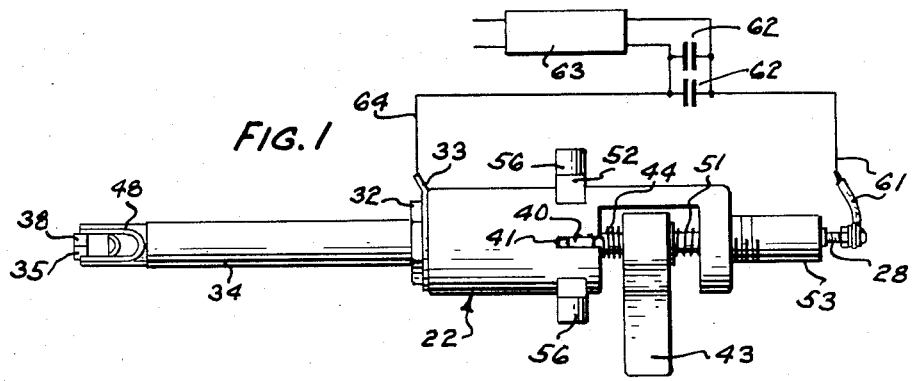
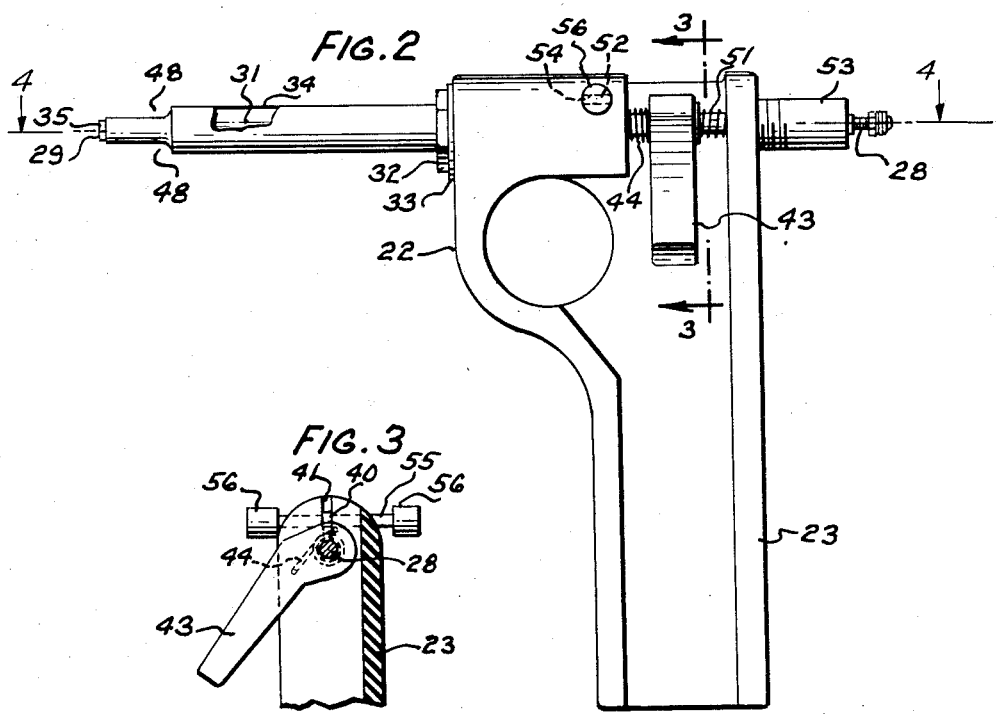
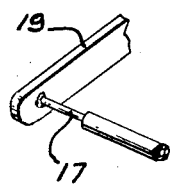
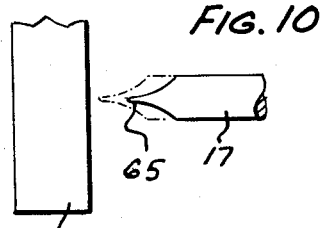
INVENTOR
A. L. QUINLAN
BY C. B. Hamilton
ATTORNEY

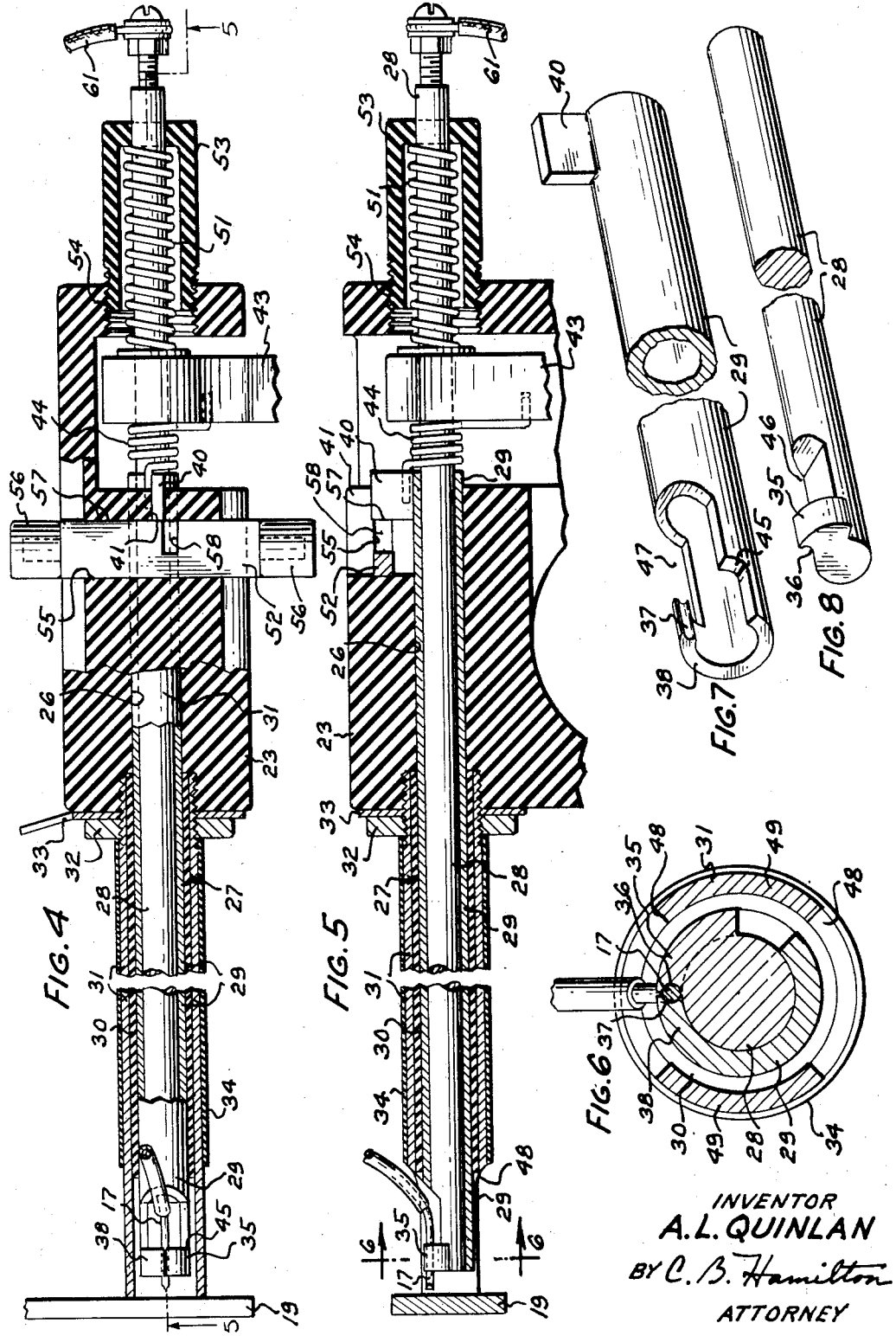

United States Patent Office 2,874,264
Patented Feb. 17, 1959

2,874,264

PERCUSSION WELDING GUN FOR WELDING WIRES TO ARTICLES

Amos L. Quinlan, La Grange Park, Ill., assignor to Western Electric Company, Incorporated, New York, N. Y., a corporation of New York Application April 27, 1956, Serial No. 581,074

8 Claims. (Cl. 219—95)

This invention relates to percussion welding guns, and more particularly to a hand tool for welding wires to terminals.

An object of the invention is to provide an improved hand tool for welding conductors to terminals.

A further object of the invention is to provide a welding gun for welding wires to articles with relatively low voltage.

A hand tool illustrating certain features of the invention for welding wires to terminals may include an electrode movably mounted on a portable frame for gripping and moving a pointed wire axially in a predetermined direction with the pointed end thereof in advance of the electrode. The movable electrode is connected to a charged capacitor to electrically connect the wire to a source of welding voltage and the electrode is stressed for movement in said predetermined direction from a retracted position where it is releasably held by a trigger. A fixed electrode on the frame is also connected to the capacitor for engaging the terminal adjacent to a selected portion thereof to electrically connect the terminal to the source of welding voltage and to position the selected portion of the terminal in the path of the pointed end of the wire and the movable electrode and in a predetermined spaced relation thereto when the movable electrode is in its retracted position whereby the trigger may be actuated to release the movable electrode which then moves the pointed end of the wire into percussive engagement with the selected portion of the terminal to draw an arc between the wire and the terminal and fuse them together.

Other objects and advantages of the invention will become apparent by reference to the following detailed description and the accompanying drawings illustrating a preferred embodiment thereof, in which—

Fig. 1 is a plan view of the welding gun showing the welding electrode in one position;

Fig. 2 is a side view of the welding gun shown in Fig. 1;

Fig. 3 is a fragmentary vertical cross-sectional view of the welding gun taken on line 3—3 of Fig. 2;

Fig. 4 is an enlarged fragmentary horizontal sectional view of the welding gun taken on line 4—4 of Fig. 2 and showing the welding electrode in retracted position;

Fig. 5 is a fragmentary vertical longitudinal sectional view of the gun taken on line 5—5 of Fig. 4;

Fig. 6 is an enlarged cross-sectional view of the welding gun taken on line 6—6 of Fig. 5 and showing the wire gripping jaws;

Figs. 7 and 8 are enlarged fragmentary perspective views of the wire gripping components of the welding gun;

Fig. 9 is a perspective view of a terminal and a wire welded thereto with the welding gun; and Fig. 10 is an enlarged fragmentary view of the end portion of a wire and a terminal to which it is to be welded.

The present hand tool or welding gun is designed to percussively weld the ends of wires 17 to terminals 19 and comprises a frame 22 of dielectric material having a pistol type handle 23. A horizontal bore 26 is provided in the upper portion of the frame 22 to receive a movable elongated composite electrode 27 comprising a rod 28 and a metal sleeve 29. This sleeve is supported for axial movement in the bore 26 and in a tubular liner 30 of dielectric material which is secured to the inner surface of a tubular fixed electrode 31, which in turn has a threaded end portion screwed into the threaded counterbored portion of the bore 26 of the frame 22. A nut 32 locks the fixed electrode 31 to the frame and secures a terminal 33 in electrically connected relation to the electrode. A sleeve or coating 34 of dielectric material covers the outer periphery of the fixed electrode 31 except for the end portion thereof. A radially disposed jaw 35 (Figs. 6 and 8) on the forward end portion of the rod 28 has an axially directed curved gripping surface 36 for engaging a portion of the wire 17 and clamping it against an axially directed curved gripping surface 37 of a jaw 38 formed on the sleeve 29 (Fig. 7). The sleeve 29 supports the rod 28 for oscillatable movement about its axis as it is moved to open or close the jaws for releasing and gripping a wire 17, and the sleeve 29 is held against rotation by a key 40 which extends radially upwardly from the other end of the sleeve into a vertically and longitudinally disposed slot 41 in the frame 22.

A lever 43 is fixed to the rod 28 for turning it to open the jaws 35 and 38 for placing a wire 17 therebetween, and a helical torsion spring 44 encircling the rod has end portions engaging the key 40 and the lever 43 for stressing the sleeve 29 and the rod 28 for rotation in opposite directions to close the jaws 35 and 38 and grip the wire 17. The sleeve 29 and the rod 28 are held against relative axial movement by the engagement of the end portion of the jaw 35 on the rod 28 with a shoulder 45 (Fig. 7) on the sleeve 29 and by the spring 44 which yieldably maintains the sleeve 29 in engagement with the jaw 35. The rod 28 and the sleeve 29 are cut away at 46 and 47, respectively (Figs. 7 and 8), to provide clearance for the insertion of a wire 17 (Fig. 5) in the jaws, and clearance openings or slots 48 are provided in the end portion of the tubular fixed electrode 31 for the wires 17.

The movable electrode 27 is stressed for movement to the left by a spring 51 from a retracted position as viewed in Figs. 4 and 5 to a forward position (Figs. 1 and 2) and the electrode is manually movable from the forward position to the retracted position where it is releasably held by a trigger 52. One end of the spring 51 fits in a recess in a cylindrical threaded member 53 which slidably supports the rod 28 and is adjustably mounted in a threaded aperture 54 in the frame 22 to vary the pressure of the spring 51 on the electrode 27. The trigger 52 is in the form of a rectangular bar slidably mounted in a transverse aperture 55 in the frame 22 and has a pair of knobs 56 of dielectric material on the ends thereof, by means of which the trigger may be moved by the operator transversely of the frame from one position to another. The electrode 27 is held in its retracted position by the engagement of the key 40 on the sleeve 29 with the rear surface 57 of the trigger 52, and the trigger has a slot 58 therein (Figs. 4 and 5) for receiving the key 40 and permitting a predetermined forward movement of the electrode 27 when the trigger is actuated to the position shown in Fig. 1.

The movable electrode is electrically connected by a conductor 61 to capacitors 62 which are charged to a potential of approximately 30 volts or more from a suitable source of power 63, and a conductor 64 from the capacitors to the terminal 33 electrically connects the capacitors 62 to the fixed electrode 31. The end surfaces of the fixed electrode 31 may be placed against a selected portion of one face of the terminal 19 for establishing an electrical connection between the terminal and the capacitors 62 and for positioning the end of the wire 17 and the movable electrode 27 in a predetermined spaced relation to the terminal when the movable electrode is in its retracted position.

When it is desired to weld the end of a wire 17 onto a terminal 19, the operator grips the handle of the welding gun and actuates the lever 43 to rotate the sleeve 29 to open the wire clamping jaws 35 and 38 and then places the end portion of the wire 17 between the jaws and releases the lever 43 to grip the wire with a predetermined portion of the wire extending forwardly in advance of the jaws as shown in Figs. 4 and 5. The lever is then moved to the right as viewed in Fig. 2 to shift the movable electrode 27 axially to its retracted position and the trigger 52 is actuated to the position shown in Fig. 4 to retain the electrode in this retracted or cocked position. The welding gun is then moved to press the end of the fixed electrode against a selected portion of the terminal 19 to which it is desired to weld the wire 17, and the trigger 52 is then moved to the position shown in Fig. 1 to release the electrode 27 which is then actuated by the spring 51 and carries the wire 17 into percussive engagement with the terminal. This serves to complete a circuit and draw an arc between the wire and the terminal as they are brought into close proximity to each other and to weld the wire to the terminal. It has been found that by providing the wire 17 with a pointed or wedge shaped tip an arc is more readily started between the wire and the terminal. Accordingly, the wire 17 is formed with a pointed or wedge shaped tip 65 by any suitable means such as by clipping a portion of the wire with a pair of pliers. As the tip of the wire is moved into close proximity with the terminal, it completes an electrical circuit and causes the capacitors 62 to discharge and form an arc between the terminal and the wire which momentarily burns off the tip portion of the wire faster than the wire is moved toward the terminal so that the arc continues for a sufficient length of time to melt the end of the wire and the adjacent portion of the terminal, which are then percussively brought together by the continued movement of the wire toward the terminal to fuse the wire and the terminal together.

The voltage and the capacitance of the capacitor 62, the velocity of approach of the wire to the terminal, and the duration of the arc may be varied within a substantial range and produce acceptable welds. Using No. 24 and No. 20 gage wires, good welds have been made with voltage from 30 to 100 volts, capacitance from 2400 to 5400 micro-farads, velocity of approach of the wire to the terminal of from 20 to 100 inches per second, and arc duration of from 1.0 to .3 micro-second.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A hand tool for percussively welding wires to articles comprising a first electrode for gripping a wire and moving it axially in a predetermined direction, mounting means normally holding the first electrode in a retracted position, a fixed electrode carried by the mounting means for engaging the article to position it in the path of movement of the wire and the first electrode and in a predetermined spaced relation thereto when the first electrode is in retracted position, and resilient means for moving the first electrode from the retracted position to advance the wire into percussive engagement with the article.

2. In a hand tool for percussively welding a wire to an article, a movable electrode for gripping a wire and moving it axially in a predetermined direction with a predetermined portion of the end of the wire in advance of the electrode, mounting means for supporting the electrode for movement to advance the wire in said predetermined direction, means for holding the movable electrode in a retracted position and for releasing it therefrom, a fixed electrode on the mounting means for engaging the article adjacent a selected portion thereof to position the selected portion of the article in the path of movement of the wire and the movable electrode and in a predetermined spaced relation to the end of the wire and the movable electrode when the movable electrode is in retracted position, and means stressing the movable electrode for movement from said retracted position to advance the wire in said one direction into percussive engagement with the selected portion of the article.

3. In a hand tool for percussively welding a wire to an article, a movable electrode for gripping a wire and moving it axially in a predetermined direction with a predetermined portion of the end of the wire in advance of the electrode, a frame for supporting the electrode for movement to advance the wire in said predetermined direction, means for holding the movable electrode in a retracted position and for releasing it, a fixed electrode on the frame having a portion thereof disposed adjacent the path of travel of the end of the wire for engaging the article adjacent a selected portion thereof to position said selected portion of the article in the path of movement of the wire and the movable electrode and in a predetermined spaced relation thereto when the movable electrode is in retracted position, and means for moving the movable electrode from said retracted position to advance the wire in said one direction into percussive engagement with the selected portion of the article.

4. In a hand tool for percussively welding a wire to an article, a movable electrode, a pair of jaws on said movable electrode for gripping a wire with a predetermined portion of the end of the wire extending in advance thereof, means for actuating the jaws to grip or release a wire, a frame for supporting the electrode for movement to advance the wire axially in a predetermined path, means for holding the movable electrode in a retracted position and for releasing it, a fixed electrode on the frame for engaging the article adjacent a selected portion thereof to position said selected portion in the path of movement of the wire and the movable electrode and in a predetermined spaced relation thereto when the movable electrode is in retracted position, and means stressing the movable electrode for movement from said retracted position to advance the wire in said one direction into percussive engagement with the selected portion of the article.

5. In a hand tool for percussively welding a wire to an article, a source of welding voltage, a movable electrode connectible to the source of welding voltage for gripping a wire with the end portion thereof projecting in advance of the electrode and for electrically connecting the wire to the source of welding voltage, mounting means for supporting the movable electrode and the wire thereon for movement along a predetermined path from a retracted position, a fixed electrode on said supporting means connected to the source of welding voltage and projecting beyond the mounting means for engaging the article to electrically connect it to the source of welding voltage and to position the article in the path of movement of the movable electrode and the wire therein and in a predetermined spaced relation thereto when the movable electrode is in said retracted position, and means for moving the movable electrode from said retracted position toward the article to move the wire into percussive engagement with the article.

6. In a hand tool for percussively welding a wire to an article, a movable electrode comprising a rod electrically connected to a source of welding voltage and a sleeve mounted thereon for axial movement therewith and for relative oscillation, said sleeve and said rod having a pair of jaws for gripping a wire therebetween with the end portion of the wire projecting in advance of the jaws, a frame for supporting the movable electrode for axial movement to and from a retracted position, means for preventing rotation of said sleeve relative to the frame, a lever on said rod for turning said rod in one direction to open said pair of jaws, resilient means for turning said rod in the other direction to close the jaws for gripping a wire therebetween, a trigger mounted on said frame for holding the electrode in the retracted position and for releasing said electrode, a tubular electrode fixed to said frame in concentric and insulated relation to the movable electrode and electrically connected to said source of welding voltage for engaging the article to electrically connect it to the source of voltage and to position the article in a predetermined spaced relation to the wire and the movable electrode when said electrode is in retracted position, and means for moving the movable electrode from said retracted position to carry the wire into percussive engagement with the article.

7. A hand tool for percussively welding wires to articles comprising a first electrode for gripping a wire, mounting means for supporting the first electrode for movement along a predetermined path, means on said mounting means for releasably holding the first electrode in a normal retracted position, a second electrode on the mounting means engageable with the article to position it in the path of movement of the wire and in a predetermined spaced relation to the first electrode and the wire when the first electrode is in said retracted position, and resilient means for moving the first electrode from the retracted position to advance the wire into percussive engagement with the article.

8. A hand tool for percussively welding wires to articles comprising a first electrode for gripping the wire, a second electrode engageable with the article, mounting means for supporting the first and second electrodes for movement of one electrode relative to the other through a predetermined path from a retracted position to effect engagement between the wire and the article, means on the mounting means for releasably holding the movable electrode in said retracted position with the wire and the article in a predetermined spaced relation to each other, and resilient means for moving the movable electrode from said retracted position to effect percussive engagement between the wire and the article.

References Cited in the file of this patent

UNITED STATES PATENTS

| | | |
|---|---|---|
| 1,066,468 | Chubb | July 8, 1913 |
| 1,327,814 | Fortescue | Jan. 13, 1920 |
| 2,419,749 | Weinhardt et al. | Apr. 29, 1947 |
| 2,683,791 | Ruehlemann et al. | July 13, 1954 |
| 2,755,365 | Frank | July 17, 1956 |